(12) United States Patent
Hebisch

(10) Patent No.: US 8,973,950 B2
(45) Date of Patent: Mar. 10, 2015

(54) UNCOUPLING ELEMENT FOR SHIELDING AGAINST STRUCTURE-BORNE SOUND

(71) Applicant: BOA Balg-und Kompensatoren-Technologie GmbH, Stutensee (DE)

(72) Inventor: Holger Hebisch, Ötigheim (DE)

(73) Assignee: BOA Balg-und Kompensatoren-Technologie GmbH, Stutensee (DE)

( * ) Notice: Subject to any disclaimer, the term of this patent is extended or adjusted under 35 U.S.C. 154(b) by 139 days.

(21) Appl. No.: 13/745,076

(22) Filed: Jan. 18, 2013

(65) Prior Publication Data

US 2013/0187375 A1    Jul. 25, 2013

(30) Foreign Application Priority Data

Jan. 20, 2012  (DE) ..................... 20 2012 000 553 U

(51) Int. Cl.
| F16L 11/12 | (2006.01) |
| F01N 13/18 | (2010.01) |
| F01N 1/24 | (2006.01) |
| F01N 13/16 | (2010.01) |
| F16L 27/11 | (2006.01) |
| F16L 51/02 | (2006.01) |
| F16L 27/111 | (2006.01) |

(52) U.S. Cl.
CPC .............. *F01N 13/1816* (2013.01); *F01N 1/24* (2013.01); *F01N 13/16* (2013.01); *F16L 27/11* (2013.01); *F16L 51/025* (2013.01); *F16L 27/111* (2013.01); *F01N 2310/00* (2013.01); *F01N 2470/12* (2013.01); *F01N 2530/00* (2013.01); *F01N 2530/24* (2013.01)
USPC .............................................. 285/49; 285/226

(58) Field of Classification Search
CPC .............................. F16L 27/1004; F16L 27/11
USPC ..................................................... 285/49, 226
See application file for complete search history.

(56) References Cited

U.S. PATENT DOCUMENTS

| 7,604,259 B2 * | 10/2009 | Cipra ............................ 285/226 |
| 2014/0027001 A1 * | 1/2014 | Matzen ......................... 138/121 |

FOREIGN PATENT DOCUMENTS

| DE | 10 2004 025946 B4 | 12/2007 |
| DE | 20 2007 003805 U1 | 7/2008 |
| DE | 20 2011 005302 U1 | 6/2011 |
| EP | 1 026 375 A2 | 8/2000 |

* cited by examiner

*Primary Examiner* — Aaron Dunwoody
(74) *Attorney, Agent, or Firm* — McGlew and Tuttle, P.C.

(57) ABSTRACT

An uncoupling element shields against structure-borne sound, especially for the exhaust pipe of internal combustion engines in motor vehicles. The uncoupling element includes a bellows (2) made of metal and a ring-shaped damping element (4) made of a lightweight composite. The damping element has particle-filled hollow steel spheres inserted at least one end of the bellows between the bellows end and a continuing pipeline.

16 Claims, 2 Drawing Sheets

UNCOUPLING ELEMENT FOR SHIELDING AGAINST STRUCTURE-BORNE SOUND

CROSS REFERENCE TO RELATED APPLICATIONS

This application claims the benefit of priority under 35 U.S.C. §119 of German Utility Model DE 20 2012 000 553.7 filed Jan. 20, 2012, the entire contents of which are incorporated herein by reference.

FIELD OF THE INVENTION

The present invention pertains to an uncoupling element made of metal for shielding against structure-borne sound in line arrangements, especially for the exhaust line of internal combustion engines in motor vehicles.

BACKGROUND OF THE INVENTION

High-frequency vibrations, so-called structure-borne sound, regularly develop in the material of the line itself in line arrangements such as exhaust lines of motor vehicles when the line arrangements in question are connected to a source generating vibrations, such as an engine or the like. The high-frequency vibrations are generated by both residual imbalances of moving parts, such as rotors of exhaust gas turbochargers or compressors, as well as by pressure pulsations in the line arrangement, for example, during the opening of exhaust valves of an engine. The structure-borne sound induced hereby propagates in the exhaust system and leads to an undesired emission of noises in the audible acoustic range in downstream devices, such as catalytic converters or mufflers.

Line elements made of metal for uncoupling high-frequency vibrations, as they are shown, for example, in EP 1 026 375 A2, are known according to the prior art for avoiding the problem of noise emission. The uncoupling is brought about accordingly in a line arrangement with a short, helical or annularly corrugated bellows with high rigidity inserted by a knitted fabric jacket placed in a non-positive or positive-locking manner being arranged on a profiled section of the bellows. However, it was found to be especially disadvantageous in such line elements that the arrangement in space of the knitted fabric jacket leads to an increase in the radial extension of the line arrangement, which collides with the crowded space conditions given in exhaust systems of motor vehicles especially when it is used in such exhaust systems. In addition, the knitted fabric jacket according to EP 1 026 375 A2 touches the bellows based on its arrangement in area in which the bellows has an especially high flexural rigidity based on its corrugated design, so that sufficient uncoupling of high-frequency vibrations cannot be achieved by such an arrangement of the damping knitted fabric jacket.

In German Patent Application DE 10 2004 025 946 B4, the bellows is the only connection between the ends of the line element. Damping pads placed on the bellows end half corrugations, with which the components of the transverse bending vibrations of the structure-borne sound that vibrate at right angles to the bellows surface are already damped markedly more effectively than this is achieved by the knitted fabric jacket placed in a positive-locking manner in the above-described EP 1 026 375 A2, are used as damping elements.

The discovery that the uncoupling of structure-borne sound, which is, in reality, a reduction of the sound intensity passed through, is achieved by diffraction, reflection or by interferences rather than primarily by attenuation by means of damping of the vibrations, as this happened in the above-mentioned documents, is the main topic of the structure-borne sound uncoupling element according to Utility Model DE 20 2007 003 805 U1. Diffractions, reflections and interferences are correspondingly generated above all by the specific introduction of inhomogeneities and discontinuities in the metal bellows by means of a corresponding design of a vibration-affecting bellows layer, which may be provided with holes, slots, impressions or small, applied metal or ceramic plates.

The proposed inhomogeneities and discontinuitities in the metal bellows lead to a considerable extra effort in connection with the manufacture of the bellows. In addition, there must, in addition, be a sealing layer in the bellows, which must be made without vibration-affecting holes and slots. Thus, a bellows layer is still present, through which the structure-borne sound can pass unhindered, because no vibration-affecting measures act in this layer.

A line element, which has a metal foam element in the form of a plated metal foam ring at at least one end of the bellows between the bellows end and the continuing pipeline, is shown in German Utility Model DE 20 2011 005 302 U1. A section, which causes multiple deflections of sound propagation due to its labyrinthine structure, is inserted in this manner in the path of the structure-borne sound. A marked reduction of the sound intensity passed through takes place here due to reflections, diffraction and interferences, even though this dissipation does not meet the increased requirements imposed on structure-borne sound damping.

SUMMARY OF THE INVENTION

A basic object of the present invention is therefore to improve an uncoupling element of the type mentioned in the introduction while avoiding the above-mentioned drawbacks such that besides an improved uncoupling and damping of high-frequency vibrations, it has a simple design.

This object is accomplished in an uncoupling element of the type mentioned in the introduction by a ring-shaped damping element made of a lightweight composite with particle-filled hollow steel spheres being inserted at at least one end of the bellows and the continuing pipeline.

Compared with massive metallic materials, lightweight composites have a markedly more favorable sound absorption characteristic as well as improved properties concerning mechanical damping. As soon as the wave front reaches the hollow spheres, the spherical shells begin to vibrate. The spherical walls transmit the energy to the particles located on the inside. It is stored temporarily as kinetic energy of the particles and then converted into heat by friction and partially elastic impacts. This process is not temperature-dependent, and particle-filled hollow spherical structures are therefore also suitable for vibration damping at higher temperatures, as they occur in the exhaust system of an automobile.

The damping element has a sandwich structure, in which the particle-filled hollow steel spheres are cast into a matrix consisting of metal or polymer.

To make a simple welded connection with the continuing pipeline and the bellows possible, the particle-filled hollow steel sphere structure is provided, either on its front sides or on its inside and outside, with a plating (end or side plates), which is connected by soldering or bonding, depending on the matrix. No additional sealing is necessary due to the closed-pore structure of the matrix/hollow sphere structure.

The properties of the composite can be set specifically by varying the following parameters:

Sphere size
Density
Matrix material
Degree of particle filling
Particle material, e.g., ceramic powder.

In order to achieve improved extinction during reflections of structure-borne sound waves, the corrugations of the bellows of the uncoupling element according to the present invention are preferably formed with different profile shapes, such as variable profile heights, variable pitches and/or variable inner flange radii.

Furthermore, provisions are made according to a preferred variant of the line element according to the present invention for at least one plated sandwich ring being used without a continuing bellows in case of exclusively high-frequency structure-borne sound transmission because the low-frequency uncoupling by the bellows can be eliminated in case of such excitation spectra.

On the whole, an uncoupling element is thus created, which has a compact design and possesses both good structure-borne sound uncoupling and, in connection with the metal bellows, good vibration uncoupling at lower frequencies.

Further features and details of the present invention appear from the claims and from the following description, in which exemplary embodiments are specifically explained with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
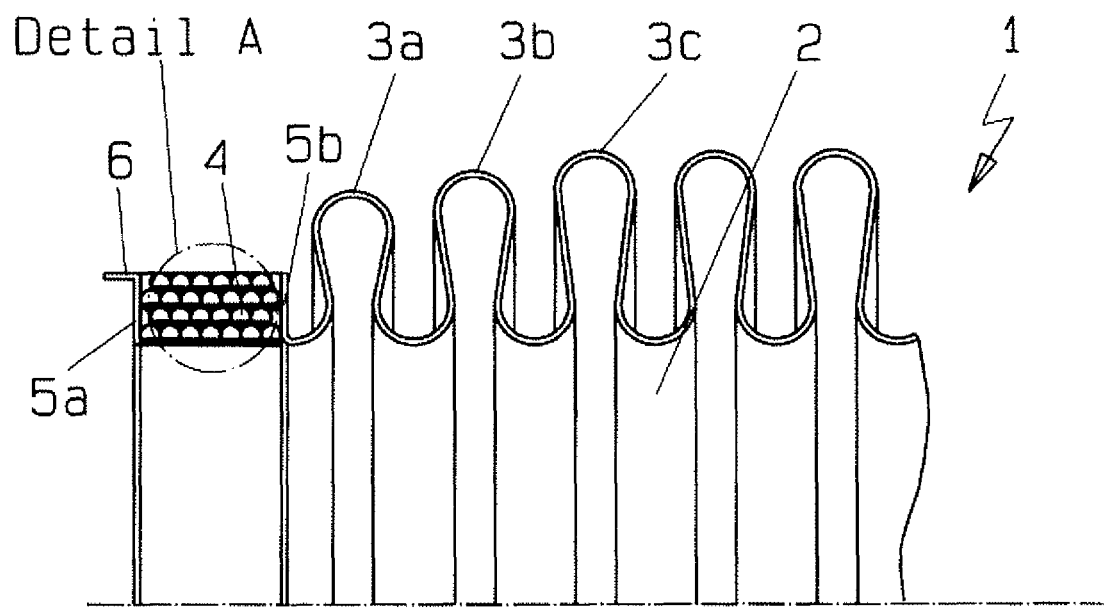
FIG. 1 is a partial sectional view of an uncoupling element according to the present invention.

Referring to the drawings in particular, FIG. 1 shows an edge area of an uncoupling element 1 according to the present invention in a partial sectional view. Uncoupling element 1 has an annularly corrugated bellows 2 made of metal, whose end corrugations 3a and 3b are reduced in diameter compared to the middle corrugations 3c. The radially outwardly shaped bellows end represents the front-side plating 5b. A ring-shaped damping element 4 made of a lightweight composite, which consists of particle-filled hollow steel spheres, which are cast in a metal matrix, is located between the front-side platings 5a and 5b. The particles within the hollow steel spheres are a ceramic powder, which fills about one third of the volume of the hollow spheres. The diameter of the hollow steel spheres is 2 mm in the embodiment being shown. The metal matrix 7 is connected to the front-side platings 5a and 5b by soldering. The sandwich ring 4 thus built up ensures the structure-borne sound uncoupling the exhaust pipe and bellows. Like metal bellows 2, plating 5a is manufactured from stainless steel. The projecting lug 6 on the plating plate 5a is used to center the exhaust pipe to be connected. The other bellows end, not shown, may optionally also have a sandwich ring 4 and is now symmetrical to the side being shown. However, if the vibration source generating the structure-borne sound is located on the engine side of the uncoupling element only, it may be sufficient to equip only one side with a damping ring and to provide a cylindrical bellows end, instead, on the other side.

Figure 2:
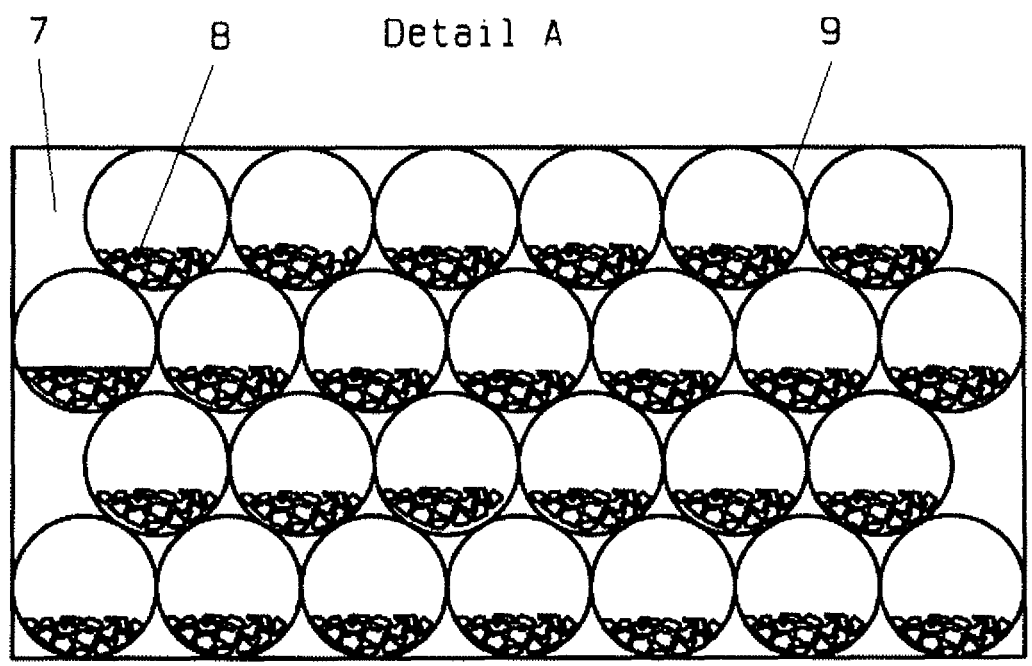
FIG. 2 is an enlarged view of detail A from FIG. 1.

FIG. 2 shows detail A from FIG. 1 in an enlarged view. The hollow spheres 9 embedded in the matrix 7, which are arranged in the form of a dense sphere packing and whose interior space is filled to about one third with ceramic particles 8, are recognized.

Figure 3:
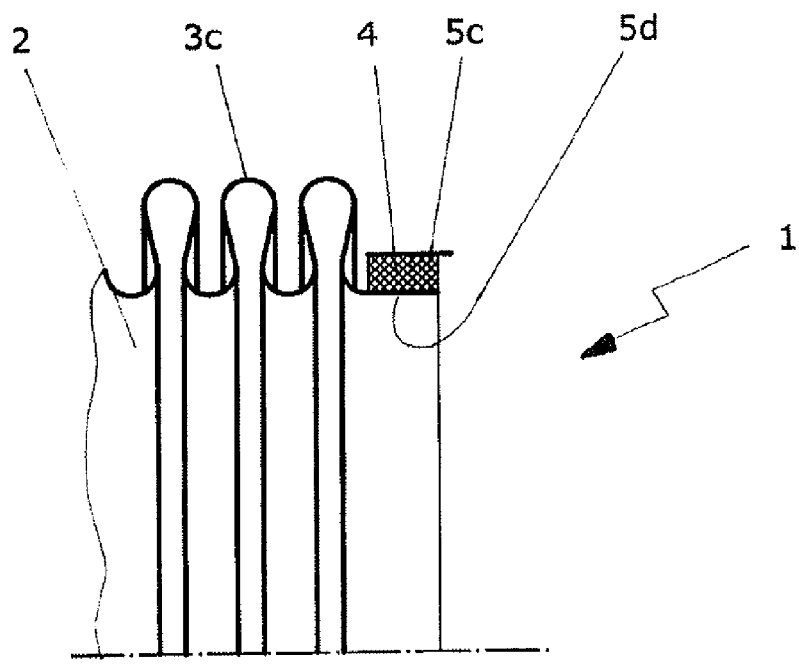
FIG. 3 is a partial sectional view of another embodiment of an uncoupling element according to the present invention.

FIG. 3 shows an edge area of another embodiment of an uncoupling element 1 according to the present invention in a partial sectional view. Uncoupling element 1 has an annularly corrugated bellows 2, whose bellows corrugations 3c have constant profile heights. Contrary to the design according to FIG. 1, the plating is arranged in this embodiment on the inside and the outside of damping ring 4. The inner plating 5d is formed by the cylindrical bellows end. The plating 5c encloses the damping ring on the outside thereof and acts at the same time as a connecting end for the welding connection the continuing exhaust pipe.

Figure 4:
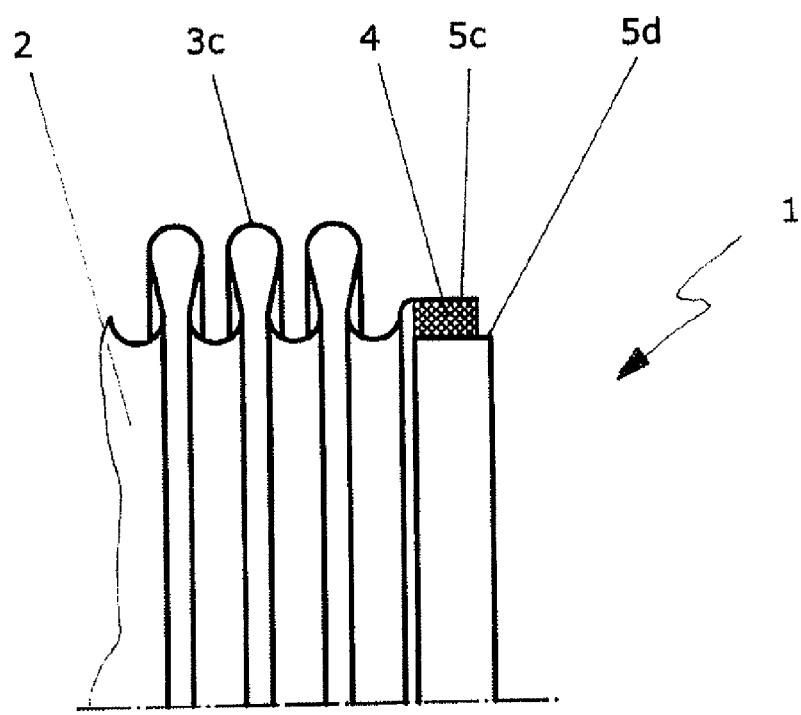
FIG. 4 is a partial sectional view of the uncoupling element according to the present invention in a third embodiment.

FIG. 4 shows the edge area of a third embodiment of an uncoupling element 1 according to the present invention in a partial sectional view. Uncoupling element 1 has again an annularly corrugated bellows 2, whose bellows corrugations 3c have constant profile heights. Contrary to the embodiment according to FIG. 3, the elevated cylindrical bellows end acts in this embodiment as an outer plating 5c, and the inner plating 5d, which limits the damping ring (4) on its inside, acts at same time as a connecting end for the welded connection with the continuing exhaust pipe, not shown.

The respective other bellows end, not shown, in FIGS. 3 and 4 may likewise have optionally a damping ring 4 and is now symmetrical to the side being shown.

While specific embodiments of the invention have been shown and described in detail to illustrate the application of the principles of the invention, it will be understood that the invention may be embodied otherwise without departing from such principles.

APPENDIX

List of Reference Numbers

1 Uncoupling element
2 Bellows
3a Edge corrugation of reduced diameter
3b Edge corrugation of reduced diameter
3c Middle corrugation with normal profile height
4 Damping element as a sandwich ring
5a Pipe-side plating plate
5b Bellows-side plating plate
5c Inside plating
5d Outside plating
6 Centering lug
7 Matrix
8 Particle filling
9 Hollow steel sphere

What is claimed is:

1. An uncoupling element for shielding against structure-borne sound for an exhaust pipe of internal combustion engines in motor vehicles, the uncoupling element comprising:
   a bellows made of metal; and
   a ring-shaped damping element made of a lightweight composite with particle-filled hollow steel spheres, the damping element being inserted at at least one end of the bellows between the bellows end and a continuing pipeline.

2. An uncoupling element in accordance with claim 1, wherein the damping element has a sandwich structure, in which the particle-filled hollow steel spheres are cast in a matrix comprising metal or a polymer.

3. An uncoupling element in accordance with claim 1, wherein the damping element comprises a plated sandwich ring.

4. An uncoupling element in accordance with claim 1, wherein the particle filling of the hollow steel spheres consists of ceramic powder.

5. An uncoupling element in accordance with claim 3, wherein front sides of the sandwich ring has platings arranged thereon.

6. An uncoupling element in accordance with claim 5, wherein the bellows end is connected in substance to the plating by welding or soldering.

7. An uncoupling element in accordance with claim 6, wherein the plating is part of the radially outwardly shaped bellows end.

8. An uncoupling element in accordance with claim 1, wherein a pipeline-side plating is provided with a centering lug.

9. An uncoupling element in accordance with claim 1, wherein the bellows is provided with a varying profile shape including at least one of a variable profile height, a variable pitch and a variable inner flange radii.

10. An uncoupling element in accordance with claim 3, wherein the plated sandwich ring comprises platings arranged on the outside and inside of the sandwich ring.

11. An uncoupling element in accordance with claim 3, wherein the plated sandwich ring comprises platings formed by the cylindrical bellows end.

12. An uncoupling element in accordance with claim 1, wherein at least one damping element is used in the form of a plated sandwich ring without continuing bellows in case of exclusively high-frequency structure-borne sound transmission.

13. An uncoupling element for shielding against structure-borne sound, the uncoupling element comprising:
   a plurality of hollow steel spheres;
   particles partially filing each of the spheres;
   a matrix, the hollow spheres being embedded in the matrix to form a ring-shaped damping element, wherein the hollow steel spheres form a sandwich structure with hollow steel spheres cast in the matrix comprising metal or a polymer;
   a bellows made of metal connected to the ring-shaped damping element; and
   a plate connected to the ring-shaped damping element.

14. An uncoupling element in accordance with claim 13, wherein the particle filling of the hollow steel spheres comprises ceramic powder.

15. An uncoupling element in accordance with claim 13, wherein an end of the bellows is connected to the ring-shaped damping element by welding or soldering.

16. An uncoupling element in accordance with claim 13, wherein the plate is annular with an annular centering lug.

* * * * *